A. HODGES & F. COOPER.
MACHINE FOR WORKING LEATHER.
APPLICATION FILED NOV. 12, 1912.

1,077,346.

Patented Nov. 4, 1913.

WITNESSES:
John C. Sanders
Albert F. Herman

INVENTORS:
Arthur Hodges
Frank Cooper
By
ATTY.

UNITED STATES PATENT OFFICE.

ARTHUR HODGES AND FRANK COOPER, OF YEOVIL, ENGLAND.

MACHINE FOR WORKING LEATHER.

1,077,346.  Specification of Letters Patent.  Patented Nov. 4, 1913.

Application filed November 12, 1912. Serial No. 730,864.

*To all whom it may concern:*

Be it known that we, ARTHUR HODGES and FRANK COOPER, subjects of the King of Great Britain and Ireland, residing at Yeovil, England, have invented new and useful Improvements in and Relating to Machines for Working Leather, of which the following is a specification.

This invention relates to machines for "working" leather and especially to rotary machines provided with V-shaped blades on the drum thereof and against which the skins are pressed.

The object of this invention is to provide an improved machine for "staking" and "ruffling," *i. e.* rendering the skin supple, stretching it in the direction required and removing all surplus flesh and the like.

According to this invention we provide a shield which extends laterally of the drum and permits the upper part of the drum to project slightly above the shield and to gradually die out within the shield, said shield projecting laterally beyond the machine.

Figure 1:
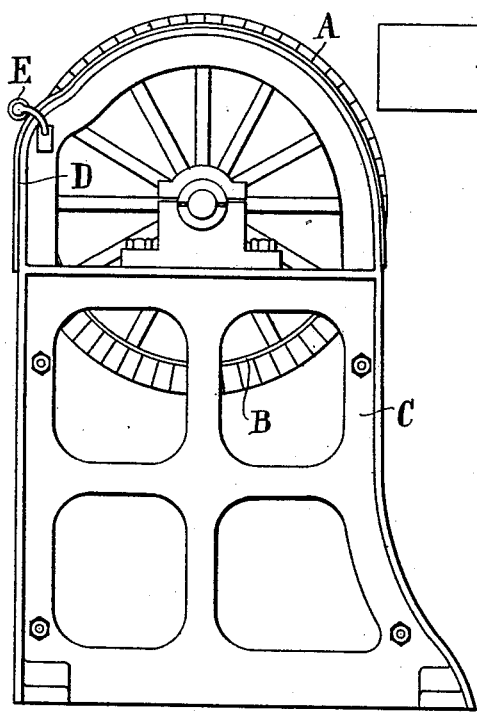
Figure 2:
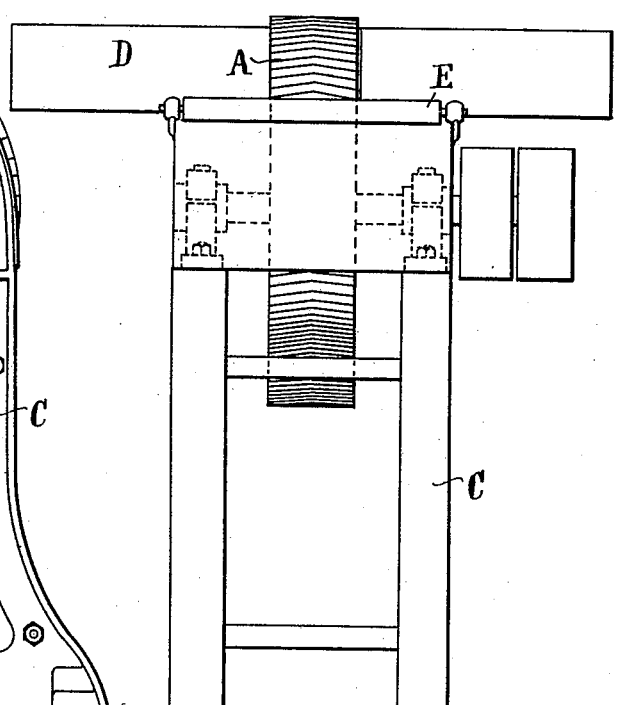
Figure 3:
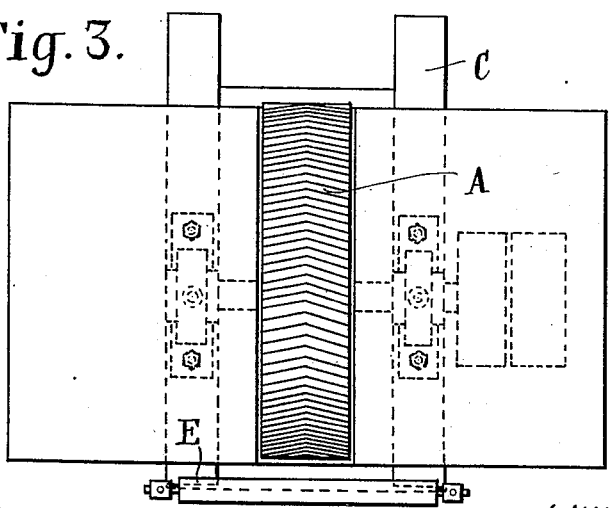

Referring to the drawings:—Figure 1 is an elevation of one form of machine made in accordance with this invention; Fig. 2 is a front elevation of the machine; Fig. 3 is a plan thereof.

A A are the blades, substantially V-shaped, B is a drum on which they are mounted, C is a frame, D is a shield which extends laterally of the drum and is curved somewhat to the form of the upper part of the drum and is so disposed in relation to the drum that the blades project slightly above the shield and gradually die out within the shield, E is the roller preferably covered with rubber or other suitable material.

The drum B is mounted on a shaft carrying fast and loose pulleys and supported on suitable bearings on the frame C. A countershaft or gearing may be employed to obtain the desired speed when necessary. The knives A are attached to the drum B by rivets at equal distances in such manner as to allow the knives to overlap.

In operation the skin is placed over the roller and the operator may work all around the edge of the skin holding the skin against the knives. He then works transversely and longitudinally of the skin from edge to edge until the whole skin is worked. The fact that the knives or blades overlap prevent the skins being pressed between the knives and becoming cut and the fact that the drum dies into the shield prevents the skins being caught between the guard and the drum. The shield projecting laterally gives ample support to the skin during the process of working.

With a machine made in accordance with this invention the operations of staking and ruffling are performed at one and the same time and the leather is stretched and softened to the fullest extent with the result that the quantity of leather from each skin is increased.

What we claim and desire to secure by Letters Patent is:—

In a leather working machine, in combination, a frame, a drum rotatably mounted thereon and having its axis of rotation in a horizontal plane, said drum having transversely positioned blades on its periphery, and shields positioned on both sides of said drum adjacent the upper portion thereof, said shields extending in the direction of the axis of said drum and forming supports for the material to be treated, the surface of said shields at the central portion thereof being below the outer edges of the blades, the surface of said shields at the front and rear portions thereof being curved outwardly with respect to the axis of the drum to extend beyond the outer edges of the blades whereby the material being treated will not be caught between the drum and the shields.

In testimony whereof we have signed our names to this specification in the presence of two subscribing witnesses.

ARTHUR HODGES.

Witnesses:
 ROBERT MILTON SPEARPOINT,
 ALFRED E. GRAY.

FRANK COOPER.

Witnesses:
 R. E. ELLIS,
 ROBERT MILTON SPEARPOINT.

---

Copies of this patent may be obtained for five cents each, by addressing the "Commissioner of Patents, Washington, D. C."